United States Patent Office 3,370,666
Patented Feb. 27, 1968

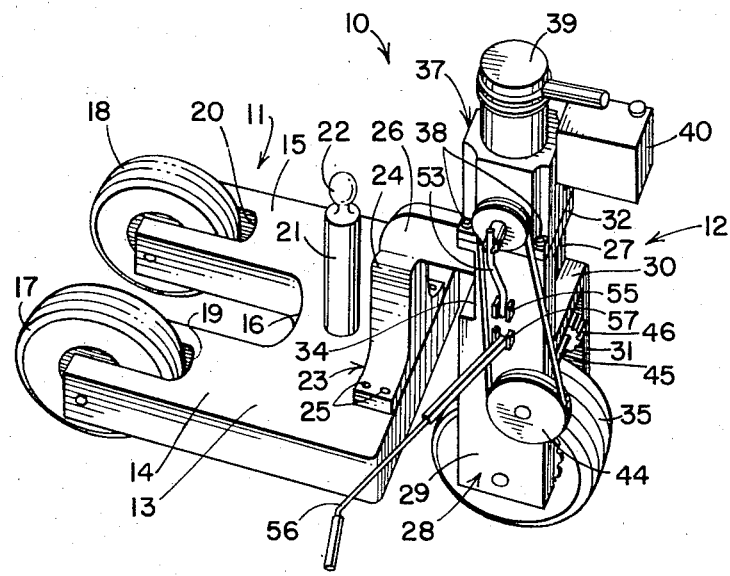

3,370,666
TRAILER MANEUVERING DEVICE
John M. Holtzclaw, 2865 E. Main St., Ventura, Calif. 93003; Frederick A. Miller, 2400 El Camino Real, Mountain View, Calif. 94040; and Ross L. McWaters, 2742 Ocean Ave., Ventura, Calif. 93003
Filed Feb. 23, 1966, Ser. No. 529,576
5 Claims. (Cl. 180—26)

ABSTRACT OF THE DISCLOSURE

A self-propelled tractor for coupling to a socket type hitch assembly of a trailer for moving the trailer including a platform with wheels mounted in the rear end, the platform defining an open, rearwardly extending slot between the wheels for receiving the hitch assembly. A power and steering unit is coupled to the front end of the platform for rotation about a vertical axis in such a manner that the tractor can be reversed in direction by rotating the entire power and steering unit through 180°.

---

This invention relates generally to power-driven vehicles and more particularly to an improved tractor particularly adapted for moving and parking trailers and the like.

The manuvering and parking of mobile homes, campers, boat trailers, and the like may be particularly difficult when the parking area is crowded or otherwise restricted in size. This is especially true when the regular towing vehicle, such as a car or truck, is used to maneuver the trailer into the restricted parking area.

Accordingly, attempts have been made to produce smaller, more compact towing devices which permit a trailer to be maneuvered more easily and within less overall area. Among the problems involved with many existing towing devices are the lack of stability under the load imposed by the trailer and relative complexity of the devices resulting in high cost of manufacture and maintenance.

With the foregoing in mind, it is accordingly a primary object of this invention to provide an improved trailer maneuvering device in the form of a compact tractor characterized by its simplified construction and stability under load.

More particularly, it is an object to provide a power-driven, three-wheeled tractor characterized by a high degree of maneuverability toward the end that moving and parking a trailer or the like may be more easily accomplished than heretofore possible with prior art devices.

Briefly, these and many other objects and advantages of this invention are attained by providing an improved tractor comprising a two-wheeled platform mounting a standard ball-type hitch member and a single-wheeled power and steering unit rotatably coupled to the wheeled platform for driving the platform in both forward and rearward directions, as desired. The wheeled platform and ball-type hitch member are constructed and arranged whereby the platform may be moved susbtantially under and straddling the hitch assembly of a parked trailer so that when the ball-type hitch member is coupled to the trailer hitch assembly, the overall length of the trailer and tractor is not greatly increased. The results of this arrangement are highly beneficial in that the required area for maneuvering is greatly reduced. Moreover, the ball-type hitch member is positioned with respect to the wheels of the tractor such that the load imposed by the trailer is more evenly distributed, resulting in a stable condition wherein the possibility of tipping the tractor is reduced.

The power and steering unit is uniquely constructed such that the overall length of the tractor is at all times maintained as short as possible, regardless of the direction of travel of the tractor. Towards this end, the power and steering unit includes a generally vertically extending frame assembly mounting a driving wheel at the bottom portion, a power transmission and control assembly in the intermediate portion, and an internal combustion engine on the top portion.

A clutch means for controlling the driving connection between the engine and driving wheel and a handle for steering the tractor are mounted proximate to each other on a side of the power and steering unit so as to be conveniently accessible to the operator standing or walking alongside the tractor.

A better understanding of the invention will be had by now referring to a preferred embodiment thereof as illustrated in the accompanying drawings, in which:

FIGURE 1 is a perspective view of the improved tractor in accordance with the invention;

FIGURE 2 is a front elevational view of the tractor of FIGURE 1;

Figure 3:
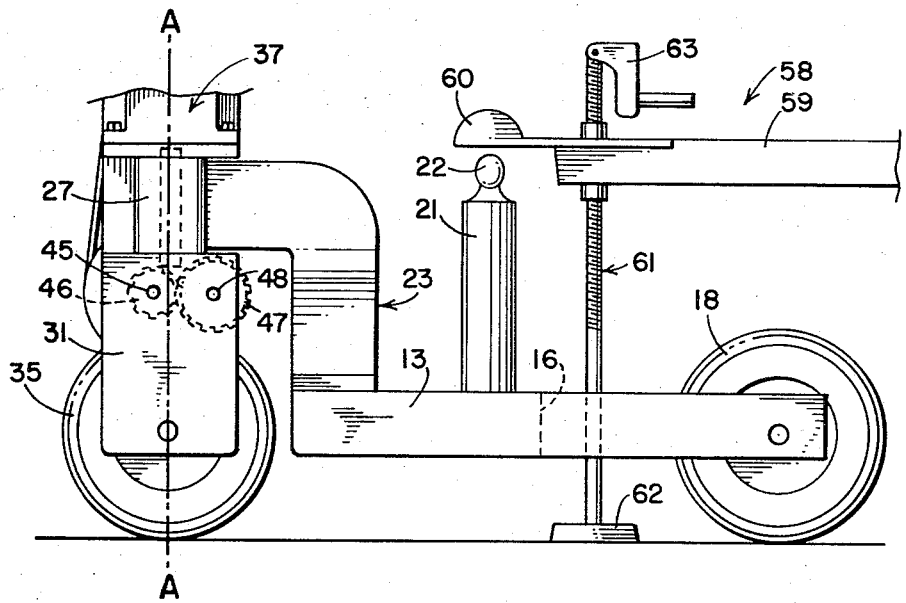
FIGURE 3 is a fragmentary side elevational view of the tractor in a position to be coupled to a hitch assembly of a trailer; and, FIGURE 4 is a fragmentary top plan view of the tractor of FIGURE 1 showing the degree of rotation of the driving unit of the tractor with respect to the platform.

Referring first to FIGURE 1, it will be seen that the tractor indicated generally at 10 includes a towing unit 11 being coupled to a power and steering unit 12. The towing unit 11 includes a generally U-shaped platform 13 having a pair of wheel receiving portions 14 and 15, respectively, being spaced apart to define a rearwardly opening slot 16. A pair of wheels 17 and 18 are mounted within the wheel receiving portions 14 and 15, respectively, and are disposed within slots or recesses 19 and 20, respectively, so as to be positioned on opposite sides of the slot 16.

In order to couple the tractor to a hitch assembly of a trailer, there is provided a vertically extending column member 21 having a standard ball-type hitch member 22 mounted on the top thereof as shown. The column member 21 is preferably secured to the platform 13 in alignment with the longitudinal extent of the slot 16 and is positioned such that the ball-type hitch member 22 is equidistantly spaced from the wheels 17 and 18.

In order to couple the platform 13 to the power and steering unit 12, there is provided an inverted, generally L-shaped coupling member 23 which includes a vertical column portion 24 being secured at its bottom end to the front of the platform 13 by means of bolts 25. The coupling member 23 includes a forwardly extending, generally horizontal portion 26 which terminates in an enlarged bearing portion shown partially at 27.

Referring to both FIGURES 1 and 2, it will be seen that the power and steering unit 12 includes a generally vertically extending frame assembly 28 which includes a vertical side member 29 having a laterally extending platform 30 extending therefrom which, in turn, includes a second side member 31 extending downwardly therefrom in parallel relation to the first side member 29. The topmost portion of the frame assembly 28 includes a laterally extending flange 32 which is spaced above and in parallel relation to the laterally extending platform 30 As best shown in FIGURE 2, the bearing portion 27 of the coupling member 23 is disposed between the platform 30 and flange 32 and is coupled thereto by means of a vertically extending pin shown in dotted lines at 33.

The frame assembly 28 is thus mounted for rotation with respect to the bearing portion 27 and, as best shown in FIGURE 1, includes a recess or slot portion 34 for increasing the degree of rotation of the frame assembly with respect to the coupling member 23.

The power and steering unit 12 is mounted on a single driving wheel 35 which is mounted on an axle 36 coupled to and extending between the side members 29 and 31, respectively, of the frame assembly 28. The axle 36 is disposed such that a vertical axis A—A defined by the connecting pin 33 bisects the axle 36 at right angles.

The tractor is adapted to be powered by a conventional one-cylinder, internal combustion engine 37 which is mounted on the flange 32 of the frame assembly 28 by means of bolts shown at 38. The engine 37 includes a cylinder head 39 and a gas tank 40. Further details of the engine are not described since the engine may be entirely conventional in design and operation. An important feature, however, resides in the position of the engine 37 relative to the remaining portions of the power and steering unit, in that the engine is disposed so as to be readily accessible for operation and maintenance.

Referring still to FIGURES 1 and 2, and also to FIGURE 3, the means for transmitting the driving power from the engine 37 to the driving wheel 35 will now be described. The engine 37 includes an output shaft 41 to which is coupled a drive pulley 42. A V-belt 43 is received over the drive pulley 42 and extends downwardly to be received by a driven pulley 44 which is coupled to a first rotatable shaft 45 mounted in the side members 29 and 31 of the frame assembly 28. A first gear 46 is mounted on the first shaft 45 and, as best shown in FIGURE 3, is positioned so as to be in driving connection with a second gear 47 mounted on a second shaft 48 extending between the side members 29 and 31 of the frame assembly 28 in parallel relation to the first shaft 45. A sprocket gear 49 is mounted on the second shaft 48 and is adapted to receive a sprocket chain 50 which extends downwardly into driving engagement with a sprocket gear 51 which is coupled to the driving wheel 35.

The above-described power transmission means is designed to substantially reduce the speed of rotation of the driving wheel 35 to enable the engine—which may be approximately 2½ horsepower—to effectively drive the tractor under a heavy load.

The driving connection between the engine and the driving wheel may be selectively engaged and disengaged by means of a conventional clutch unit 52 coupled to the drive pulley 42, which may be of the split-flange type. A means for actuating the clutch unit 52 to, in turn, cause the split flange pulley 42 to engage or disengage the V-belt 43, includes a clutch handle 53 coupled to the clutch unit 52 by a link pin 54. The handle 53 is pivotally coupled to the side member 29 of the frame assembly 28 by means of a pivot joint shown at 55. Thus, the operator may control the drive of the driving wheel 35 by engaging or disengaging the clutch unit 52 by simply pivoting the clutch handle 53 inwardly or outwardly, respectively.

Figure 4:
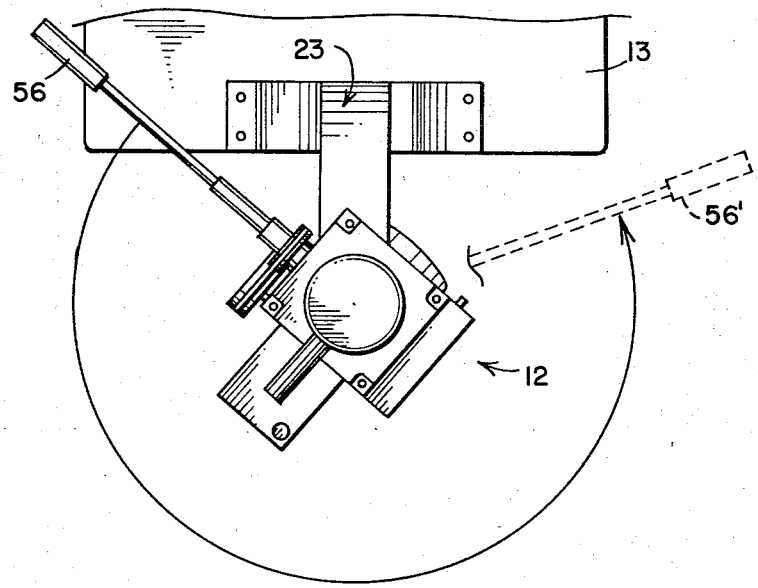

The tractor is designed to be steered by rotating the power and steering unit 12 about the vertical axis defined by the pin 33 extending through the bearing portion 27 of the coupling member 23. Towards this end, a steering handle 56 is pivotally coupled at 57 to the side member 29 of the frame assembly 28. As best shown in FIGURE 4, the handle 56 and hence the power and steering unit 12, is rotatable from the position shown in solid lines through an angle of approximately 240° to the position shown in dotted lines at 56'. Accordingly, it will be apparent that the steering of the tractor as well as forward and reverse directions are determined by the selected driving orientation of the driving wheel 35.

The steering handle 56 and clutch handle 53 are preferably mounted proximate to each other on the side member 29 enabling the operator to conveniently control the tractor from that side of the power and steering unit 12.

The operation of the unit will best be understood by referring to FIGURE 3 wherein the tractor is shown positioned with respect to a conventional trailer hitch assembly 58 prior to coupling. The hitch assembly 58 includes a draft tongue 59 terminating in a standard socket hitch member 60 adapted to receive the ball hitch member 22. A jack 61 normally holds the hitch assembly 58 in the position shown on a base plate 62 resting on the ground. In the conventional manner, the height of the draft tongue 59 and socket member 60 may be controlled by turning a crank handle 63 mounted on the jack 61.

It will be apparent that the tractor is uniquely designed to be coupled to a trailer or the like in such a manner that the overall length of the trailer and tractor is maintained as short as possible for easier maneuvering. Towards this end, it will be seen that the wheeled platform 13 may be moved substantially under the hitch assembly 58 with the slot 16 receiving the jack 61 so that the platform 13 straddles the jack. Due to this arrangement, the ball-type hitch member 22 may be positioned forwardly of the rear wheels 17 and 18 a sufficient extent to provide more uniform weight distribution on the tractor, which also prevents the tractor from tipping backward about the rear wheels as is possible with conventional towing devices wherein the ball-type hitch member may be positioned directly over the rear wheels. Moreover, the more uniform weight distribution provided by the above arrangement eliminates the necessity of providing additional wheels on the tractor to stabilize the same.

After the socket member 60 of the hitch assembly of the trailer has been coupled to the ball hitch member 22, the engine is started and the clutch unit is engaged to drive the driving wheel 35. It will be apparent that the direction of movement of the tractor is controlled by merely pivoting the power and steering unit by means of the handle 56 to thus orient the driving wheel in the desired direction. As above described with reference to FIGURE 4, the power and steering unit is rotatable through approximately 240°, thereby enabling the tractor to move forwardly or rearwardly as desired, without the requirement of a gear shifting mechanism or similar means.

From the foregoing, it is apparent that this invention provides a simplified and compact towing device capable of moving and parking trailers and the like in areas restricted in size, while at the same time providing a conveniently operable and stable device.

Various changes falling within the scope and spirit of this invention will occur to those skilled in the art. The trailer maneuvering device is therefore not to be thought of as limited to the specific embodiment set forth.

What is claimed is:

1. A self-propelled tractor adapted to be coupled to a socket-type hitch assembly of a trailer for moving said trailer, said tractor comprising: a platform having wheels mounted in wheel receiving portions on its rear end, said wheel receiving portions being spaced apart to define a rearwardly opening slot in said platform for receiving a portion of said hitch assembly; a ball-type hitch member mounted on said platform in alignment with the longitudinal extent of said slot, said ball-type hitch member being equidistantly spaced from said wheels and positioned to receive the socket of said socket-type hitch assembly; and a power steering unit coupled to the front end of said platform for rotation about a vertical axis, said power and steering unit including a frame assembly mounting an engine and a driving wheel in driving connection for propelling said platform in selected forward and rearward directions; and a clutch means mounted on said power and steering unit and operable by means of a handle pivotally coupled to said frame assembly for selectively engaging and disengaging the driving connection between said engine and said driving wheel.

2. The subject matter of claim 1, in which said power and steering unit further includes a steering handle pivotally coupled to said side of said frame assembly for rotating said power and steering unit about said vertical axis, said steering handle being positioned proximate to said clutch means, whereby both said steering handle and said clutch means are readily accessible to an operator for controlling the tractor.

3. A self-propelled tractor adapted to be coupled to a socket-type hitch assembly of a trailer for moving said trailer, said tractor comprising: a platform having wheels mounted in wheel receiving portions on its rear end, said wheel receiving portions being spaced apart to define a rearwardly opening slot in said platform for receiving a portion of said hitch assembly; a ball-type hitch member mounted on said platform in alignment with the longitudinal extent of said slot, said ball-type hitch member being equidistantly spaced from said wheels and positioned to receive the socket of said socket-type hitch assembly; and a power and steering unit coupled to the front end of said platform for rotation about a vertical axis, said power and steering unit including a frame assembly mounting an engine and a driving wheel in driving connection for propelling said platform in selected forward and rearward directions; said platform being coupled to said power and steering unit by means including a coupling member mounted on the front end of said platform and extending upwardly and forwardly therefrom, said coupling member terminating at its forward end in an enlarged bearing portion having an opening therethrough defining said vertical axis; said frame assembly including parallel portions vertically spaced apart to receive said bearing portion therebetween; and a pin received through said opening in said bearing portion and coupled to said parallel portions, respectively.

4. The subject matter of claim 3, in which said engine is mounted on the topmost of said parallel portion of said frame assembly so as to be positioned above said bearing portion, whereby said engine is readily accessible for operation and maintenance.

5. A self-propelled tractor adapted to be coupled to a socket-type hitch assembly of a trailer for moving said trailer, said tractor comprising: a platform being supported at its rear end by a pair of wheels, said wheels being spaced apart to define a rearwardly opening slot in said platform adapted to receive a portion of said hitch assembly; a ball-type hitch member mounted on said platform in alignment with the longitudinal extent of said slot and being eqiuidistantly spaced from each of said wheels; an upwardly and forwardly extending coupling member secured to the front end of said platform and terminating in an enlarged bearing portion having a vertically extending opening defined therethrough; a frame assembly rotatably coupled to said bearing portion by means of a pin received through said opening, whereby said frame assembly is rotatable about a vertical axis defined by said opening through an arc greater than 200°, said frame assembly including a pair of spaced side members extending downwardly in parallel relation; a driving wheel mounted between said side members on an axle extending therebetween, said axle being bisected at right angles by said vertical axis; an internal combustion engine mounted on a top portion of said frame assembly so as to be disposed above said bearing portion of said coupling member; power transmission means coupled between said engine and said driving wheel; and a steering handle pivotally coupled to one of said side members of said frame assembly for rotating said frame assembly about said vertical axis to thereby steer the tractor in selected forward and rearward directions.

References Cited
UNITED STATES PATENTS

| | | | |
|---|---|---|---|
| 2,649,162 | 8/1953 | Wooldridge et al. | 180—13 |
| 2,877,911 | 3/1959 | Arnot. | |
| 2,924,287 | 2/1960 | Bramley | 180—26 |
| 2,939,721 | 6/1960 | Smith et al. | 180—26 X |
| 3,166,141 | 1/1965 | Shields et al. | 180—19 X |

KENNETH H. BETTS, *Primary Examiner.*